(12) United States Patent
Hackett (10) Patent No.: US 9,021,962 B2
(45) Date of Patent: May 5, 2015

(54) BRAKE AND CAPTURE SYSTEM FOR ZIP LINING

(71) Applicant: Donald Hackett, Hendersonville, TN (US)

(72) Inventor: Donald Hackett, Hendersonville, TN (US)

( * ) Notice: Subject to any disclaimer, the term of this patent is extended or adjusted under 35 U.S.C. 154(b) by 0 days.

(21) Appl. No.: 14/101,853

(22) Filed: Dec. 10, 2013

(65) Prior Publication Data

US 2014/0158012 A1   Jun. 12, 2014

Related U.S. Application Data

(60) Provisional application No. 61/735,480, filed on Dec. 10, 2012.

(51) Int. Cl.
*B61H 9/02* (2006.01)
*F16D 63/00* (2006.01)

(52) U.S. Cl.
CPC ............... *B61H 9/02* (2013.01); *F16D 63/008* (2013.01)

(58) Field of Classification Search
CPC ........ B61H 9/02; B61D 63/008; A63G 21/20; A63G 21/22; B61B 7/00; B61B 12/06; B60T 11/046
USPC ................................................ 104/113, 117.1
See application file for complete search history.

(56) References Cited

U.S. PATENT DOCUMENTS

| | | | | |
|---|---|---|---|---|
| 5,931,100 | A * | 8/1999 | Sutton et al. | 104/53 |
| 7,966,941 | B1 * | 6/2011 | Brannan | 104/113 |
| 2006/0027134 | A1 * | 2/2006 | Steele et al. | 104/113 |
| 2007/0039788 | A1 * | 2/2007 | Fulton | 188/164 |
| 2007/0215569 | A1 * | 9/2007 | Chepurny et al. | 212/228 |
| 2009/0255436 | A1 * | 10/2009 | Buckman | 104/117.1 |
| 2009/0266267 | A1 * | 10/2009 | Moss | 104/53 |
| 2010/0243374 | A1 * | 9/2010 | Boren et al. | 182/15 |
| 2011/0162917 | A1 * | 7/2011 | Steele et al. | 188/65.2 |
| 2012/0145498 | A1 * | 6/2012 | Liston et al. | 188/378 |
| 2012/0160122 | A1 * | 6/2012 | Lerner et al. | 104/113 |
| 2014/0158012 | A1 * | 6/2014 | Hackett | 104/113 |
| 2014/0326161 | A1 * | 11/2014 | Halliday et al. | 104/113 |

OTHER PUBLICATIONS

KIPO, International Search Report and Written Opinion for PCT/US2013/074122, mailed Apr. 14, 2014.

* cited by examiner

*Primary Examiner* — Jason C Smith
(74) *Attorney, Agent, or Firm* — PatentBest; Andrew McAleavey (57) ABSTRACT

A brake and capture system for zip lining are disclosed. The brake has a housing with first and second ends. Inside the brake are a number of fixed guide plates, each with an angled slot. A number of wheels are mounted are movably mounted within the housing so as to be guided by the angled slots. When the brake is struck by a trolley with sufficient momentum, the wheels within the brake are driven inwardly by the angled slots, into rolling engagement with the zip line, to slow the trolley. The trolley and brake may be provided with complementary engaging structures, such that the brake may be sent out on the zip line to capture the trolley if it has insufficient momentum.

21 Claims, 13 Drawing Sheets

BRAKE AND CAPTURE SYSTEM FOR ZIP LINING

CROSS-REFERENCE TO RELATED APPLICATIONS

This application claims priority to U.S. Provisional Patent Application No. 61/735,480, filed Dec. 10, 2012. The contents of that application are incorporated by reference in their entirety.

BACKGROUND OF THE INVENTION

1. Field of the Invention

In general, the invention relates to equipment and apparatuses for zip lining, and more particularly to a brake and capture system for zip lining.

2. Description of Related Art

A zip line is a rope line or wire suspended above the ground, typically on an incline. Zip lines are usually suspended at least several meters above the ground, and heights of over 100 meters have been used. In zip lining, a trolley or pulley system is mounted on the zip line, and a passenger travels from one end of the zip line to the other, propelled by gravity, by hanging from the trolley. Zip lines themselves are not new; however, zip lining has recently been growing in popularity as a recreational activity and sport.

Zip lining poses a number of safety and logistical problems. Among those problems is the speed of zip lining. In order to reach the other end of the line, a zip liner must accumulate enough speed and momentum to reach the other side. If the trolley is too slow (e.g., because the zip line is not inclined steeply enough), friction and other factors may cause the trolley to stop moving in the middle of the line, leaving the rider stranded and requiring course personnel to go out onto the line and haul the trolley in, a difficult process made more difficult and dangerous by the height.

While lack of sufficient speed is a problem, too much speed is also a problem. Simply put, zip liners need some mechanism to stop. In some cases, zip liners are simply issued thick leather gloves, and are expected to slow down by grabbing the zip line above them. Dislocated shoulders are not an infrequent result of this maneuver. Mats and netting have also been used, but none of these mechanisms provide an easy mechanism for stopping.

There are some braking and arresting systems, like that taught in U.S. Patent Application Publication No. 2011/0162917 to Steele et al., but these types of systems often require extensive modifications or additions to existing course equipment, and have not been widely used.

SUMMARY OF THE INVENTION

One aspect of the invention relates to a braking system for zip lining. The brake is installed on the zip line and connected to the zip line support at the end of the zip line, or to another fixed point, by its own line. The brake has fixed and moveable internal portions. Within the brake, sets of resilient wheels are mounted for movement relative to the housing of the brake. The wheels are guided by fixed guide plates that include angled slots oriented to drive the wheels into rolling engagement with the zip line as they move relative to the brake housing. The wheels themselves are mounted via ball bearings for relatively frictionless movement. Arcuate spokes extend between the centers of the wheels and their outer treads. As the wheels move into engagement with the zip line, the spokes of the wheels may flex torsionally and absorb the energy of movement.

Another aspect of the invention relates to a capture system for a zip lining trolley. In embodiments according to this aspect of the invention, an engagement mechanism is installed on a trolley, such as a standard Robertson trolley, preferably without the need to modify the trolley. In one embodiment, the engagement mechanism includes a set of pins that extend forward of the trolley and engage the brake, described above, when the trolley and the brake come into contact. The pins are resiliently biased such that once they engage the brake, the trolley and brake will not disengage until the pins are manually disengaged. Thus, a passenger who has insufficient momentum to reach the end of the zip line can be "rescued" by sending the brake out along the zip line until the trolley contacts the brake, and then hauling the engaged brake and trolley to the end of the zip line.

In various embodiments of the invention, the brake itself may include fewer wheels, and different mechanisms may be used to couple and coordinate the movement of the wheels within the brake.

These and other aspects, features, and advantages of the invention will be set forth in the description that follows.

BRIEF DESCRIPTION OF THE DRAWING FIGURES

The invention will be described with respect to the following drawing figures, in which like numerals represent like elements throughout the figures, and in which.

DETAILED DESCRIPTION

Figure 1:
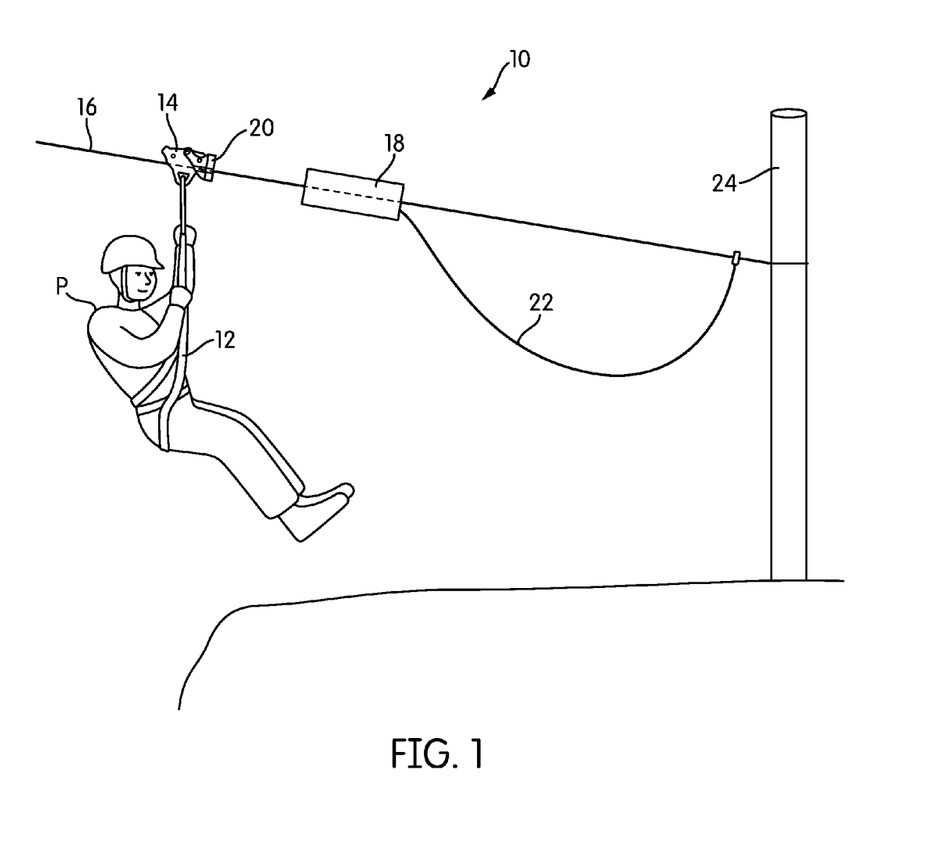
FIG. 1 is a perspective view of a passenger zip lining using an apparatus that includes a system according to an embodiment of the invention.

FIG. 1 is a perspective view of a capture and braking system according to an embodiment of the invention, generally indicated at 10, in use. As shown in FIG. 1, a passenger P is attached by way of a harness 12 to a trolley 14 that rides on a zip line 16. Positioned on the zip line 16 is a brake 18. The trolley 14 includes an engaging mechanism 20 that connects to and engages with the brake 18 when the two 18, 20 come into contact with one another, as will be described below in more detail.

As shown in FIG. 1, the brake 18 is connected by a rope or line 22 either to the zip line 16 itself or to a zip line support 24 at the end of the zip line 16. The arrangement of the brake 18 and the line 22 is such that the brake 18 can be thrown or slid out along the zip line 16 some distance away from the support 24, so that the trolley 14 will contact the brake 18 some distance before the end of the zip line 16, giving the brake 18 time and space to slow and stop the trolley 14 and the passenger P. Typically, that distance might be on the order of 20-30 feet (i.e., about 7-10 meters), although greater and lesser distances may be used. As will be described in more detail below, because of the positive engagement between the engaging mechanism 20 on the trolley 14 and the brake 18, the brake 18 and its attached line 22 can also be used to reach and rescue a passenger P who has insufficient momentum to reach the end of the zip line 16. In that case, longer lines 22 may be used.

Figure 2:
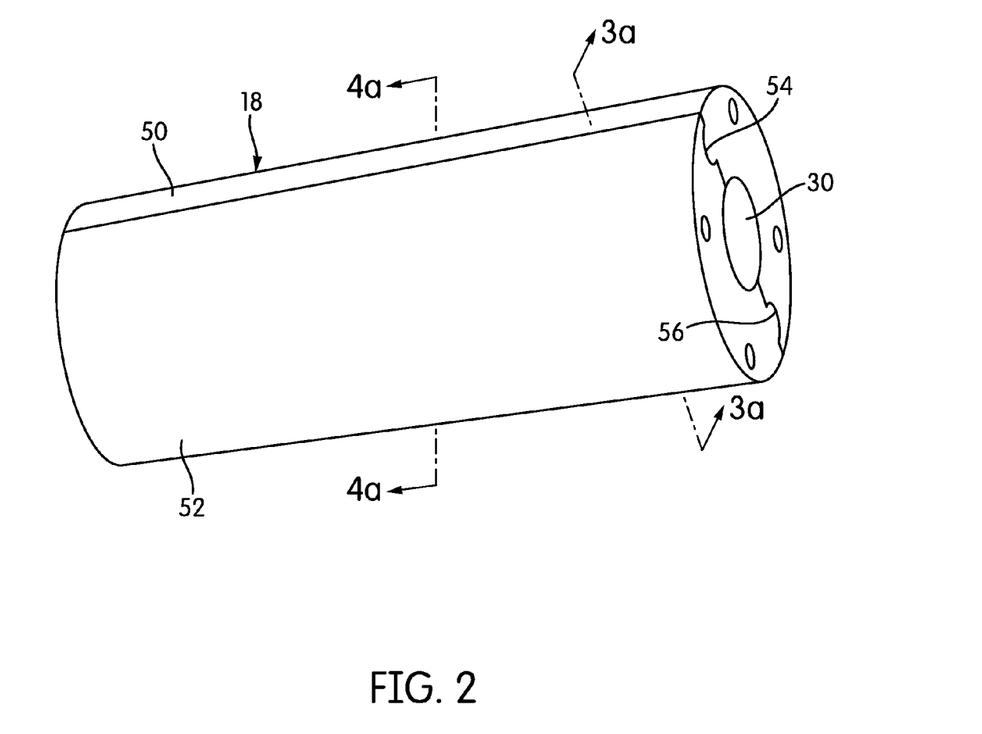
FIG. 2 is a perspective view of the brake of FIG. 1, shown in isolation.

As can be seen from FIG. 1 and from FIG. 2, a perspective view of the brake 18 in isolation, the brake 18 has a generally cylindrical shape, although the exterior shape of the brake 18 is not critical and may vary from embodiment to embodiment. The cylindrical brake 18 is comprised of two semi-cylindrical interengaging halves 26, 28. A central opening 30 is defined in the brake 18 between the two halves, allowing the zip line 16 to pass entirely through the brake 18. In some embodiments, one end of the brake 18 may include a rotating line connector 32 that connects the brake 18 to the line 22 and allows the brake 18 to rotate with respect to the line 22 without fouling the line or causing deleterious twisting or wear. In one embodiment, for example, the brake 18 as a whole may be about 5.5 inches in diameter.

As was explained above, in a typical zip lining apparatus, there is some range of velocities that will carry the passenger P safely to the end of the line or course. A rider with too much velocity or momentum may not be able to slow down sufficiently, and a rider with too little velocity or momentum may stop in the middle of the zip line 16. In general, the brake 18 is designed to slow those passengers P whose velocity or momentum is too large, without significantly reducing the velocities of those passengers who would otherwise make it to the end of the zip line 16 or course without incident.

Figure 3A:
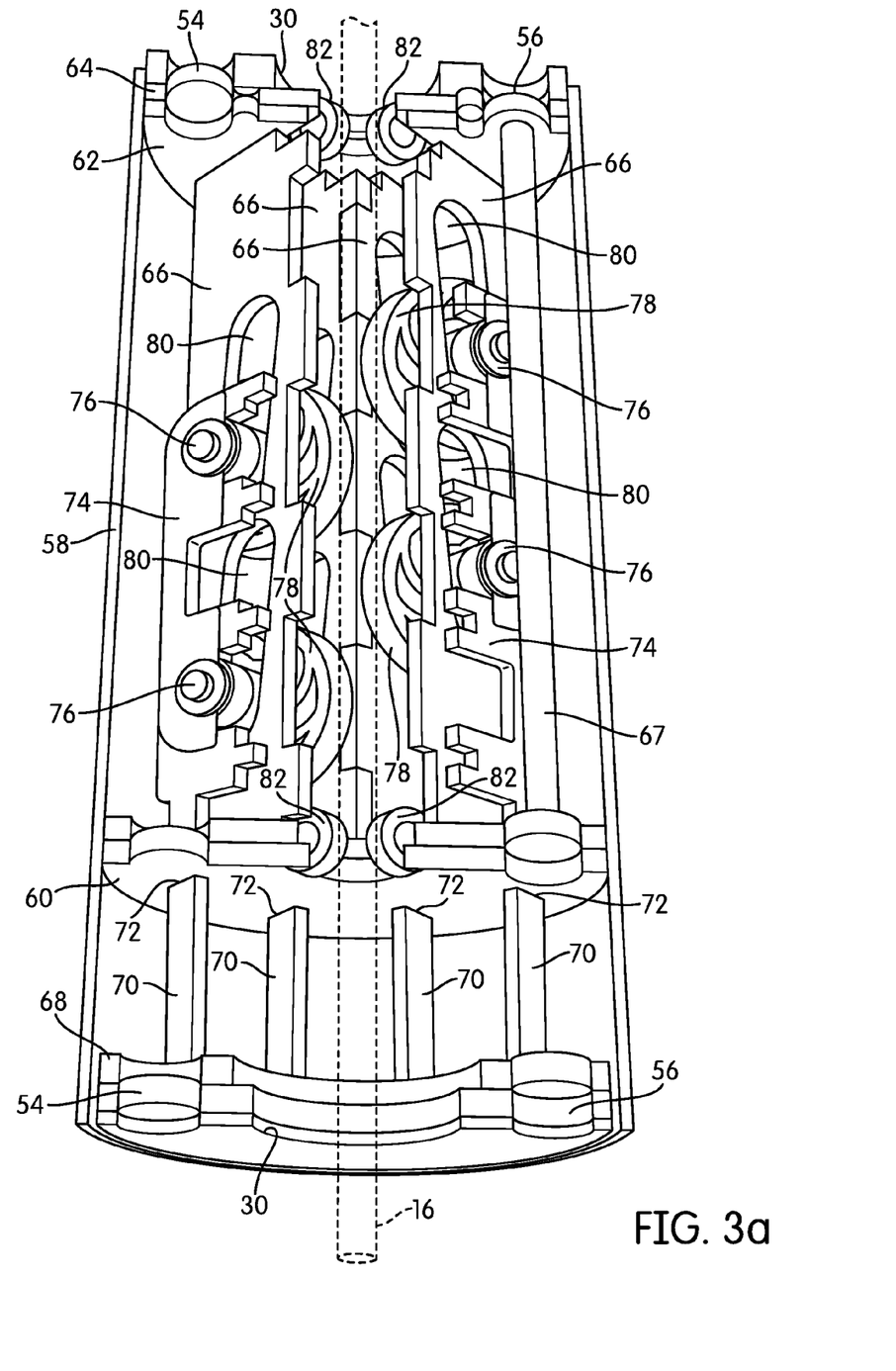
FIG. 3A is a sectional perspective view of one half of the brake of FIG. 2 in a first position.

FIG. 3A is a perspective view of one half 50 of the brake 18 in a first position, illustrating its interior arrangement. As can be seen in FIGS. 2 and 3A, at each end of the brake 18, each half 50, 52 includes sets of cooperating, interengaging structures 54, 56 which, in the illustrated embodiment, are sets of circular and semicircular projecting tabs and corresponding slots.

Mounted within the semicylindrical outer housing 58 of the brake half 50 is a set of fixed guide structures, on which a moveable carriage is mounted. Specifically, one fixed plate 60 is fixedly mounted a distance from the end of the brake 18, and a corresponding second fixed plate 62 is fixedly mounted immediately adjacent the endplate 64 of the brake 18 at the other end. Extending longitudinally along the brake 18 between the two fixed plates 60, 62 are a set of four fixed guide plates 66. Also present to reinforce the fixed structure are two fixed rods 67, one in each half 50, 52 of the brake 18.

The movable carriage has its own end plate 68, to which are attached four wheel support bracket rods 70. The wheel support bracket rods 70 extend through corresponding slots 72 in the fixed plate 60, beyond which they have forked portions 74 that are adapted to support the axles 76 of wheels 78. As mounted, the end plate 68 and its attached wheel support bracket rods 70 can slide along the length of the housing 58. The range of motion of the movable carriage, i.e., the range of motion of the end plate 68 and its attached wheel support rods 70 is defined by the distance between the end of the housing 58 and the fixed plate 60. The wheel support bracket rods 70 are positioned to correspond roughly with the position of the fixed guide plates 66 so that the wheel support bracket rods 70 form the movable support for sets of wheels 78 while the guide plates 66 provide the fixed support, as will be described in greater detail below.

As shown in FIG. 3A, each half 50, 52 of the brake 18 carries two sets of two wheels 78, such that the brake 18 as a whole has four sets of two co-linear wheels 78. The sets of wheels 78 are placed in opposition to one another, as will be explained below in greater detail, although the individual sets of wheels 78 may be slightly offset from one another. In the illustration of FIG. 3A, the sets of wheels 78 and the supporting hardware are positioned at approximately 90° with respect to each other, such that the four sets of wheels 78 will be distributed evenly along the 360° circumference of the brake 18 when the brake 18 is fully assembled. For rigidity, the guide plates 66 are interengaged with one another via sets of teeth and corresponding sets of slots on their inwardly-facing edges. As shown in FIG. 3A, the two guide plates 66 under the wheels 78 are engaged with one another, while the guide plates 66 on the other sides of the wheels 78 will be interengaged when the two halves 50, 52 are fully engaged.

Figure 3B:
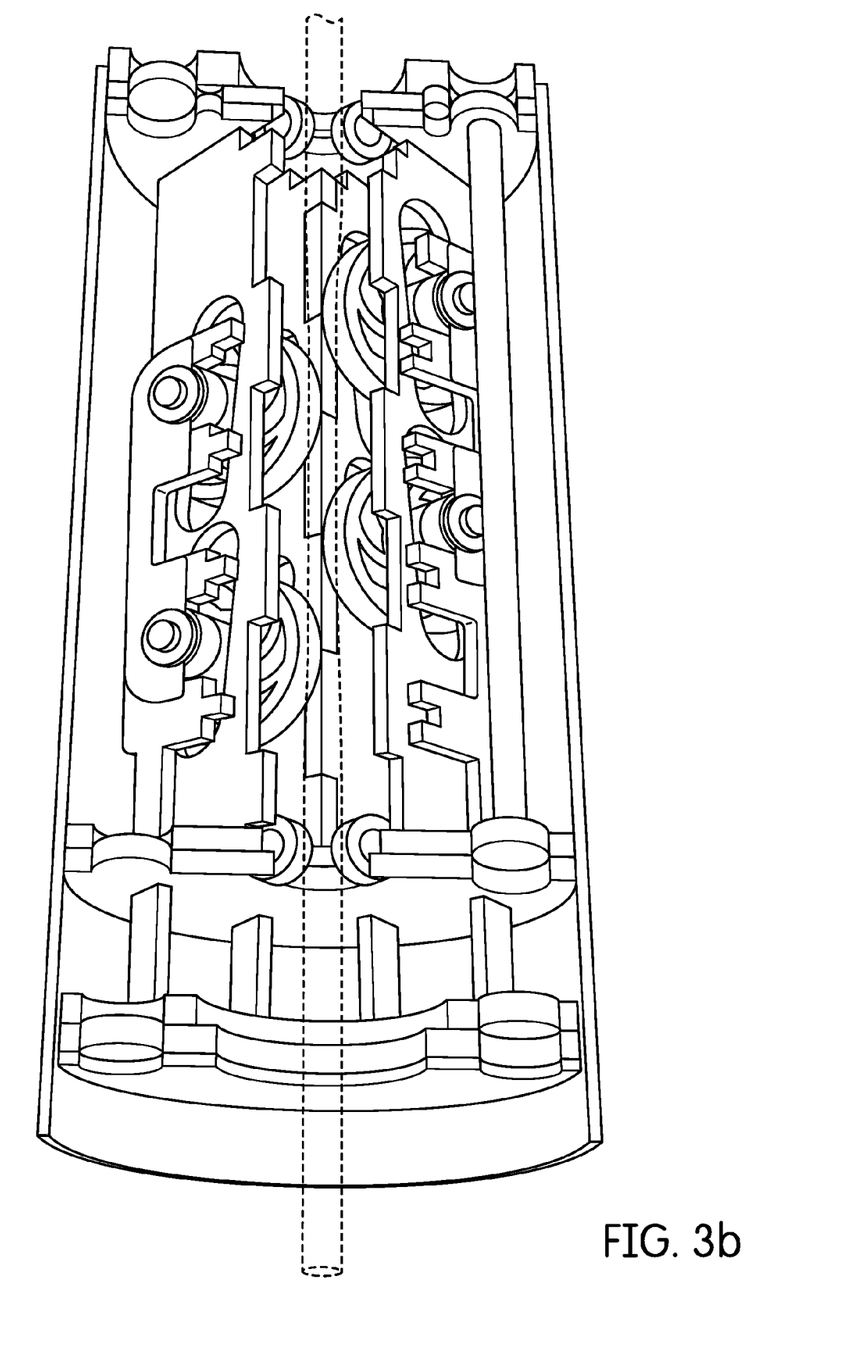
FIG. 3B is a sectional perspective view of the other half of the brake of FIG. 2 in a second position.

The fixed guide plates 66 each have angled slots 80 in them to guide the positions of the wheels 78 as the movable structure within the brake 18 moves relative to the fixed structure. The wheel support bracket rods 70 and the guide plates 66 are arranged relative to one another such that there is one wheel support rod 70 on each side of each wheel 78, and also one guide plate 66 on each side of each wheel 78. The slots 80 in the guide plates 66 direct the wheels 78 toward the center of the brake 18 as they travel. FIG. 3A illustrates the brake 18 with the wheels 78 at one end of the slots 80, as disengaged as the wheels 78 can be; FIG. 3B is a perspective view similar to that of 3A with the wheels 78 farther along the slots 80 and closer to engagement.

Generally speaking, the housing 58 of the brake 18, the guide plates 66 and the wheel support rods 70 are made of a rigid material, such as a metal. For example, they may be made of steel or aluminum.

The zip line 16 enters and exits the brake 18 through its central openings 30. As shown in FIG. 3A, it extends proximate to the wheels 78, and as the movable carriage moves relative to the housing 58 of the brake 18, the wheels 78 are brought into rolling engagement with the zip line 16. Guide wheels 82 are positioned at both ends of the brake 18 adjacent the path of the zip line 16 to guide the zip line 16 and reduce friction on it. In the position of FIG. 3A, the wheels 78 are at their farthest extent; in the perspective view of FIG. 3B, the wheels 78 are closer to engagement with the zip line 16.

Figure 4A:
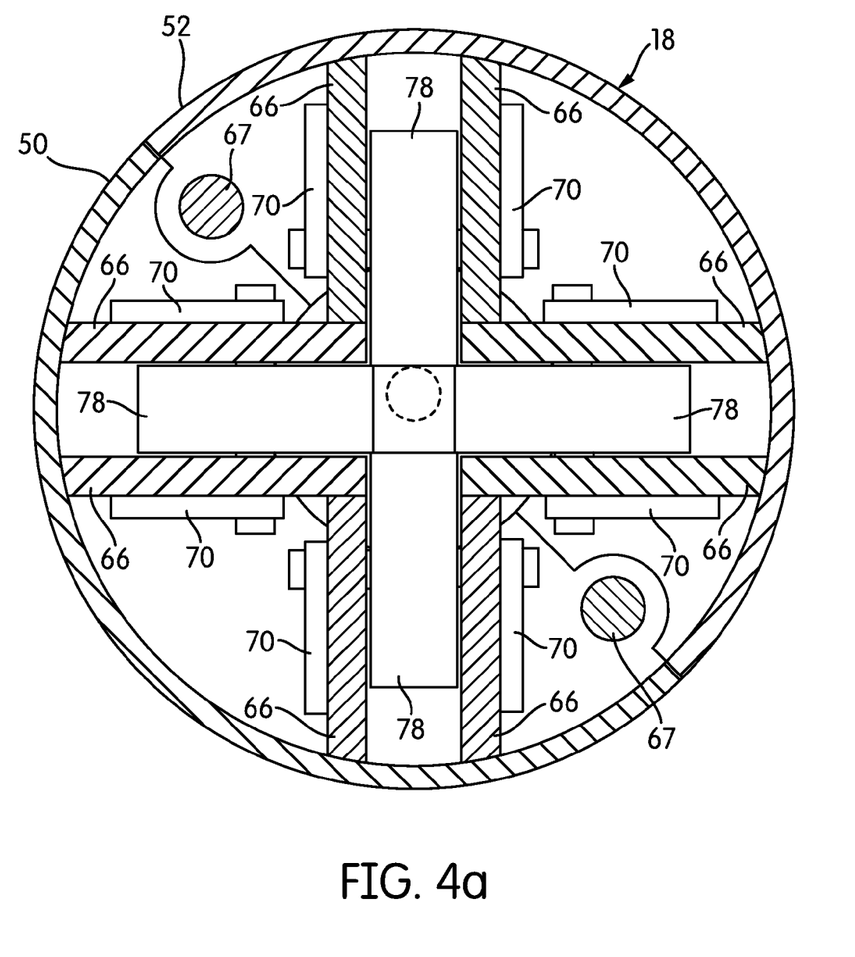
FIG. 4A is a cross-sectional view of the brake, taken through Line 4A of FIG. 2, illustrating the brake in a first position.
Figure 4B:
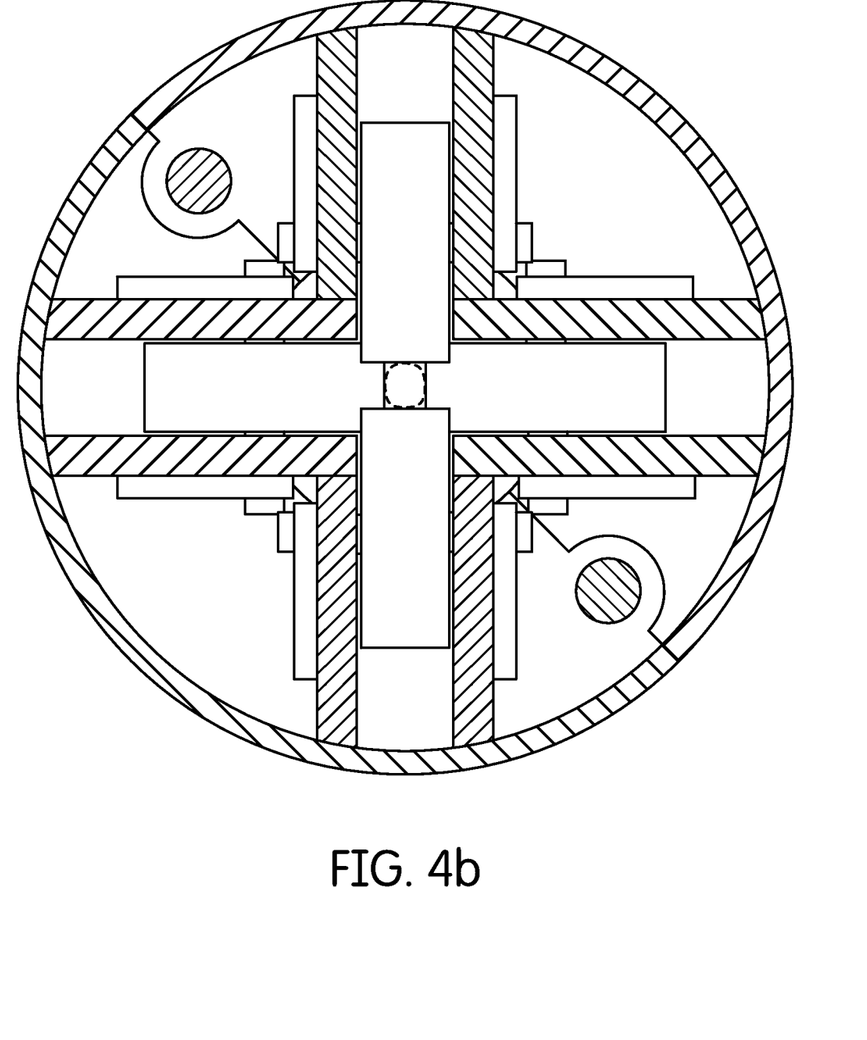
FIG. 4B is a cross-sectional view of the brake similar to the view of FIG. 4A, illustrating wheels of the brake in engagement with a rope.

FIGS. 4A and 4B are cross-sections of the brake 18 taken along Line 4A-4A of FIG. 2, illustrating the movement and engagement of the wheels 78 with the zip line 16. As was noted briefly above, when the two brake halves 50, 52 are engaged, the sets of wheels 78 are in opposition to one another. As they move, the slots 80 in the guide plates 66 move them into engagement with the zip line 16. More particularly, FIG. 4A shows the position of the wheels 78 when the moveable carriage is at its farthest extent, the position illustrated in FIG. 3A. FIG. 4B illustrates the manner in which the wheels 78 come into engagement with the zip line 16.

FIGS. 5A-5D are schematic views that illustrate the details of the wheels 78 and the guide plates 66 with their slots 80. The slots 80 have an angle of approximately 7° toward the center of the brake 18 in the illustrated embodiment, although greater and smaller angles may be used in other embodiments, and the angle chosen will affect both the amount of momentum necessary for the brake to engage and the length of the brake 18 itself. For example, angles in the range of about 5° to about 7.5° may be used, with shallower angles rendering the brake 18 more sensitive to lower contact forces. As can be seen in FIGS. 5A-5D, the slots 80 do not have a straight, smooth profile in the illustrated embodiment, although they may in some embodiments. Rather, at least one edge of the slots 80 has a stepped profile that provides five individual "levels" or areas that help to prevent the brake mechanism from re-setting itself as long as the brake 18 continues to move forward.

Figure 5A:
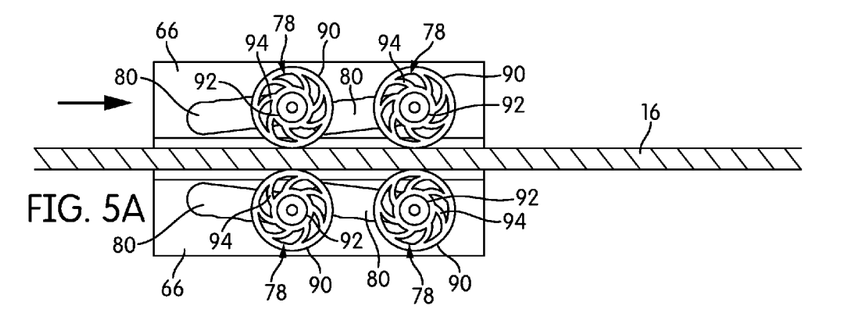
FIGS. 5A-5D are schematic views of the wheels and guides of the brake of FIG. 2, illustrating how the wheels interact with the rope under various conditions.
Figure 5B:
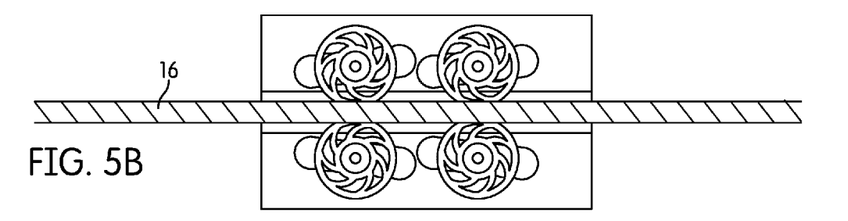
Figure 5C:
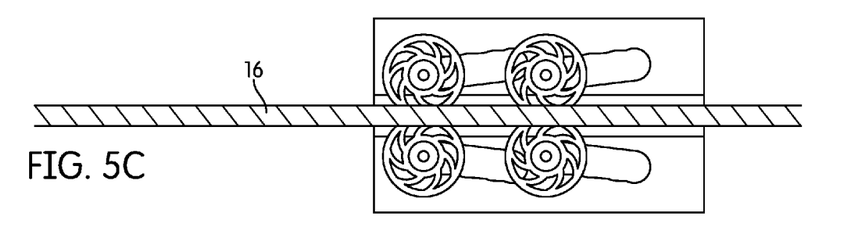

The wheels 78 are preferably made of a material that has some resilience, such as a urethane resin with a hardness of about 90 Shore A. The wheels 78 themselves are preferably mounted on their axles via ball bearings, to provide for relatively frictionless rotation. The outer tread 90 of the wheel 78 is connected to its center 92 by means of a plurality of arcuate spokes 94, seven of them in the embodiment shown in the drawings. As shown in FIGS. 5B and 5C, as the wheels 78 move into engagement with the zip line 16, they may deflect inwardly, and the spokes 94 may flex torsionally relative to the outer tread 90 and the center 92. Flexion of the spokes 94 may help to absorb the energy of motion and bring the passenger P to a stop. Preferably, the material of which the wheels 78 are made will not cause significant wear on the zip line 16, as the wheels are brought into engagement; ideally, the engagement of the zip line 16 and the wheels 78 does not cause significant frictional wear on either part.

Figure 5D:
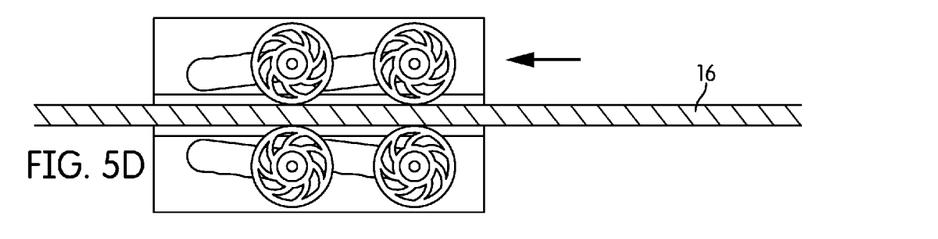

Thus, when a rider P contacts the brake 18, the brake 18 engages if the rider's momentum is sufficient to move the moveable carriage and wheels 78 of the brake 18 relative to the housing 62 of the brake 18. As was explained above, the angle of the slots 80, among other factors, may influence the contact force necessary for the brake 18 to engage. As shown in FIG. 5D, the brake 18 can be re-set by pushing it backward along the zip line 16.

Figure 6:
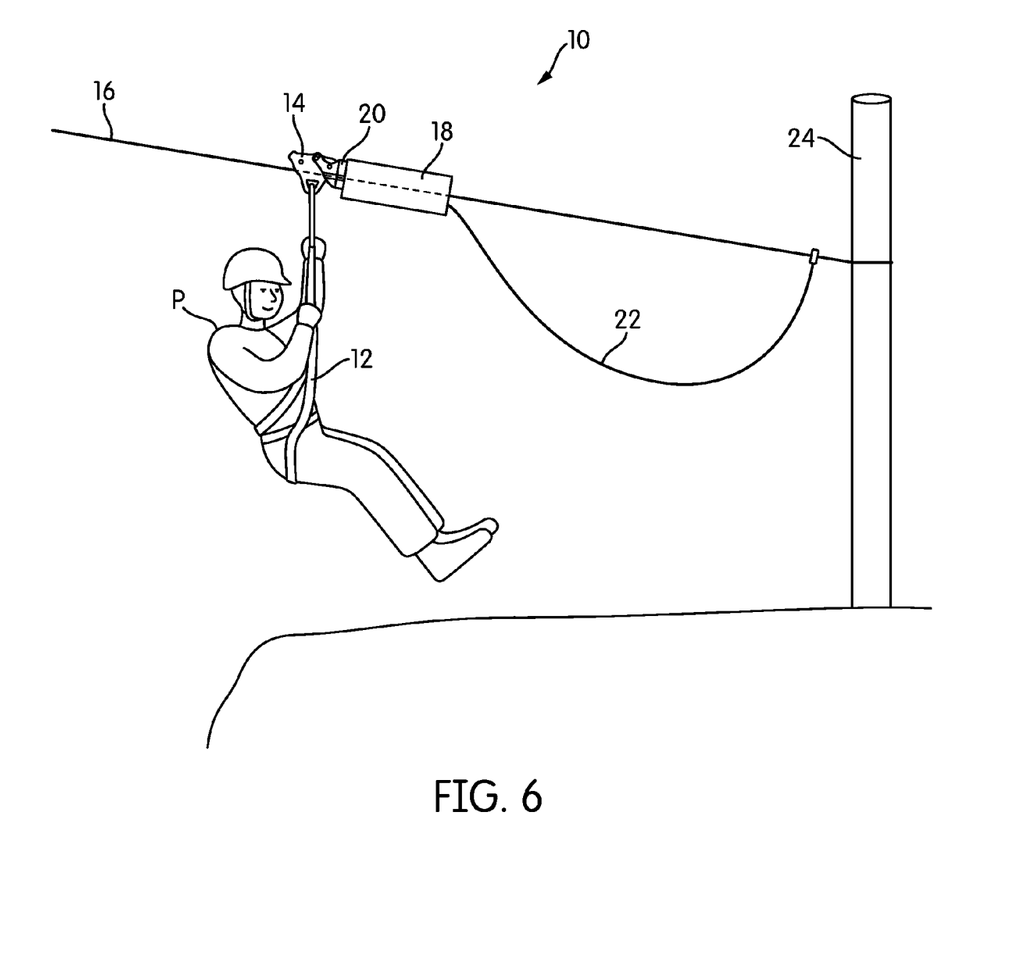
FIG. 6 is a perspective view similar to the view of FIG. 1, illustrating the positive-lock engagement between the brake and the trolley.

FIG. 6 is a perspective view of the system 10 similar to the view of FIG. 1, illustrating an advantage of system 10. As was described briefly above, in addition to braking, system 10 also acts as a capture system. Specifically, the trolley 14 carries an engaging mechanism 20 which is configured and adapted to positively engage the brake 18 when the two 18, 20 come into contact. Therefore, a passenger P who has insufficient speed or momentum to reach the end of the zip line 16 can be "rescued" by sending out the brake 18 on its line 22, and causing it to engage and latch the engaging mechanism 20 on the trolley 14. Hauling the line 22 back to the support 24 will bring in the passenger P.

Figure 7:
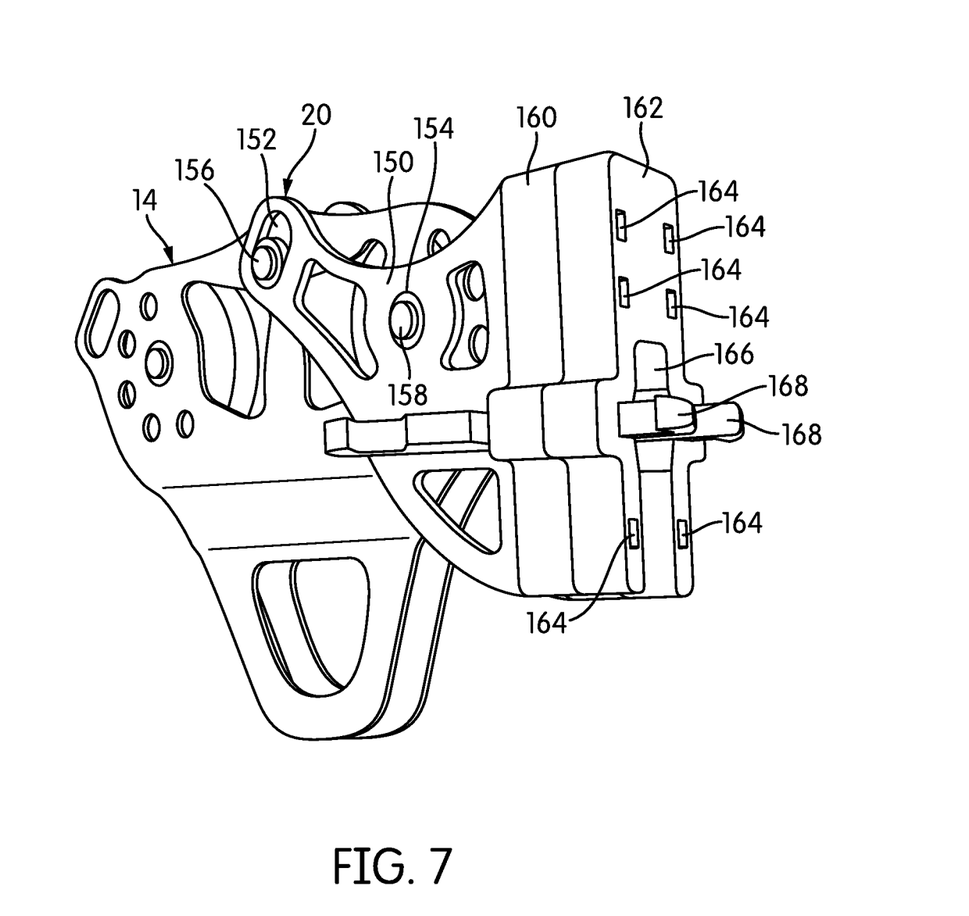
FIG. 7 is a perspective view of a trolley with an engaging mechanism according to an embodiment of the invention.

FIG. 7 is a perspective view of the trolley 14 and the engaging mechanism 20 in isolation. The trolley 14 illustrated in FIG. 7 is a standard Robertson-type zip lining trolley. As shown, one advantage of the engaging mechanism 20 is that it fits over the standard trolley 14 without the need to modify it. Specifically, a bracket 150 extends over each side of the trolley 14 and has openings 152, 154 that correspond to the locations of bolts 156, 158 that hold the trolley 14 together, which allows the engaging mechanism 20 to fit over the trolley 14 without interfering with its function. At the front end of the engaging mechanism 20, a joining plate 160 attaches to the two side brackets 150. The joining plate 160 may attach to the side brackets 150 by means of bolts, machine screws, or other traditional fastening mechanisms. However, in the illustrated embodiment, the two side brackets 150 have forwardly-extending hooks that hook into slots provided in the joining plate 160.

The two side brackets 150 and the joining plate 160 would typically be made of a rigid or substantially rigid material, such as aluminum or steel. However, in order to cushion any impact forces that may occur in engaging the brake 18, the engaging mechanism 20 also includes a bumper 162 attached to the forward-facing surface of the joining plate 160. The bumper 162 would typically be made of a resin, such as a urethane resin, or another flexible material. In the perspective view of FIG. 7, it can be seen that the bumper 162 also includes a number of slots 164 through which hooks or projections from the two side brackets 150 extend to secure the parts 150, 160, 162 together. Thus, the bumper 162 and joining plate 160 hold the engaging mechanism 20 together.

Figure 8:
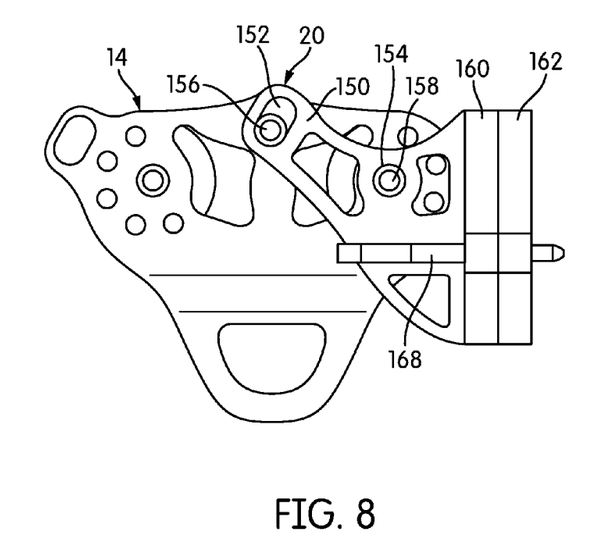
FIG. 8 is a side elevational view of the trolley and engaging mechanism of FIG. 7.
Figure 9:
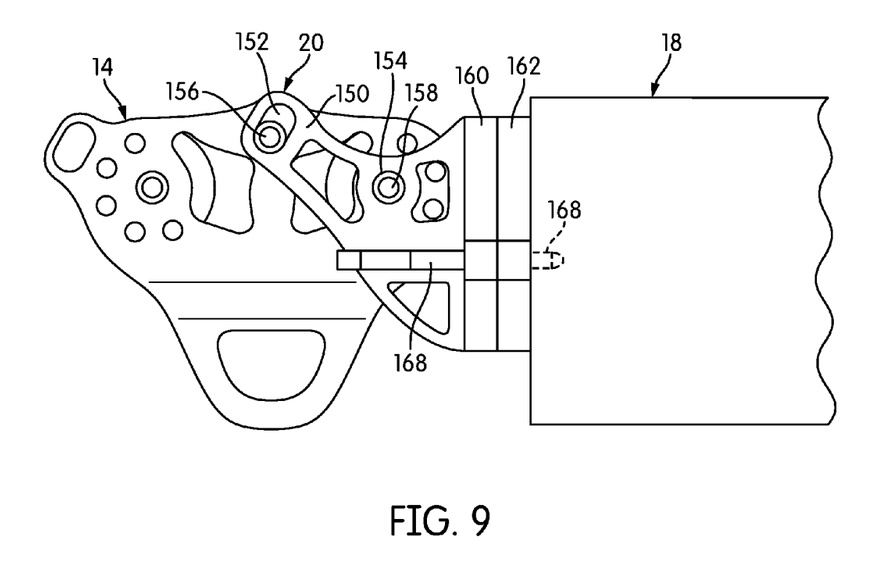
FIG. 9 is a side elevational view of the trolley and engaging mechanism of FIG. 7 shown as engaged with a brake.

The engaging mechanism 20 also has a forwardly-facing opening 166 defined by the contours in the joining plate 160 and the bumper 162. As can be seen in FIG. 7 and the side perspective view of FIG. 8, attached to the respective side brackets 150 and extending through the opening 166 are two attaching pins 168. The pins 168 are biased by a resilient member or members, such as a spring that bears between the two pins 168, to bear against the sides of the opening 166. The pins 168 are positioned to coincide with the central opening 30 of the brake 18. When the pins 168 contact the brake 18, the shape of the forward ends of the pins 168 drives the pins 168 inwardly, allowing the pins 168 to enter the central opening 30 and lock within the brake 18, the position shown in FIG. 9. Because they are biased outwardly to bear against the walls of the opening 166, the pins 168 will not disengage unless a user manually pushes inwardly on them. Thus, if the engaging mechanism 20 impacts the brake 18, the two 18, 20 become engaged and will not disconnect unless manually disengaged by pushing the pins 168 inwardly.

Figure 10:
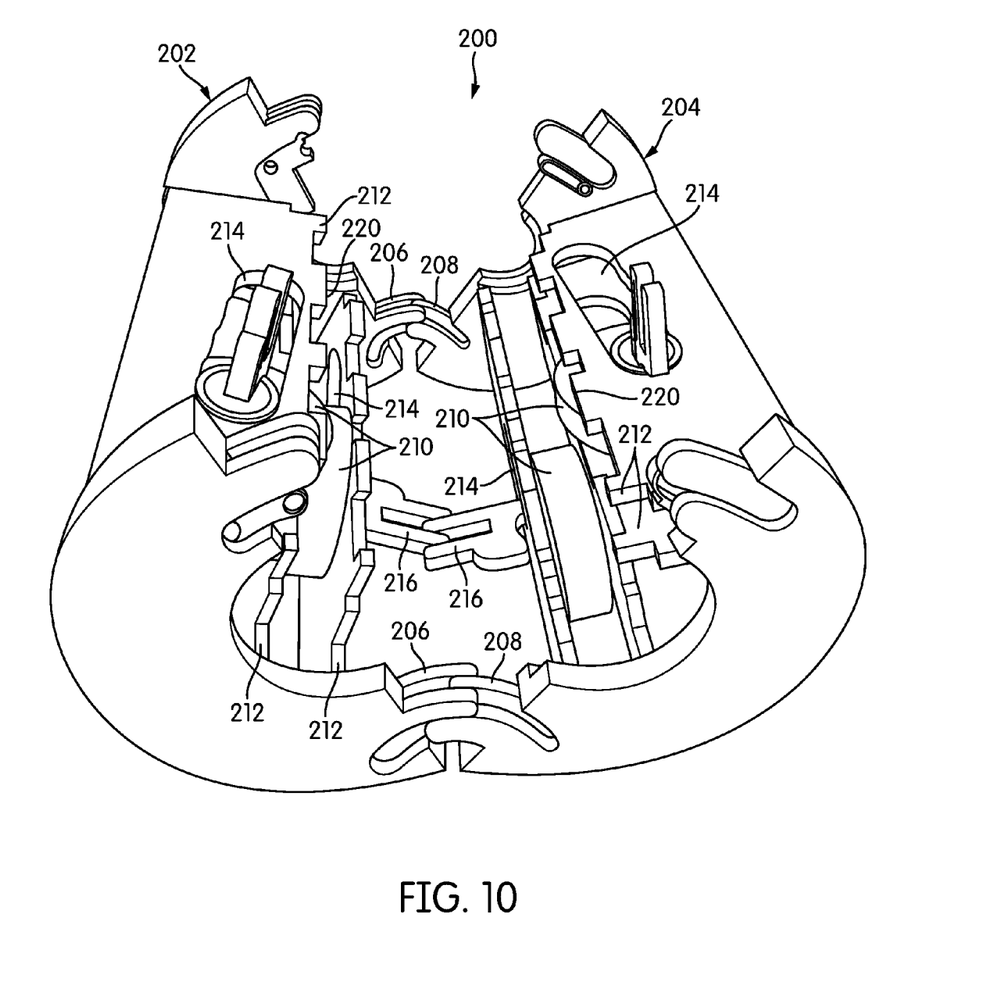
FIG. 10 is a perspective view of a brake according to another embodiment of the invention, shown with its two halves in partial engagement.

In the description above, the brake 18 has two sets of four wheels, for a total of eight wheels. Other embodiments of the invention may use shorter brake canisters and fewer wheels. For example, FIG. 10 is a perspective view of the interior of a brake 200 according to another embodiment of the invention. In the perspective view of FIG. 10, the two halves 202, 204 are partially opened to show their interior. As shown, each half 202, 204 has sets of engaging features 206, 208 that join the two halves 202, 204 and allow them to open and close with a hinge-like motion. More particularly, the engaging features 206, 208 comprise arcuate projections that are positioned relative to one another such that they interdigitate as they engage.

The brake 200 includes four wheels 210, which are spoked, as described above, and are mounted via ball bearings. Each wheel 210 is supported on both sides by fixed guide plates 212. The guide plates 212 have slots 214 in them into which the axles of the wheels 210 extend. The slots 214 are angled and, in addition, have at least one nonlinear edge that defines specific positions of the wheels. The slots 214 may have an angle of about 7°, although as noted above, greater and lesser angles may be used.

Rather than the fixed carriage/moveable carriage arrangement of the brake 18, the brake 200 has interengaging features on each wheel 210 that engage and synchronize the movement of the four wheels 210. Specifically, each side of each wheel axle includes a projecting forked portion 216 that engages with the forked portion 216 of the adjacent wheel 210. Thus, when the two halves 202, 204 are fully closed and engaged, all four wheels 210 are engaged with one another. Additionally, each guide plate 212 has a toothed pattern of rectangular projections and depressions 220 on its inwardly-extending edge, which engage with the corresponding projections and depressions 220 on adjacent guide plates 212 when the two halves 202, 204 are fully engaged.

Figure 11:
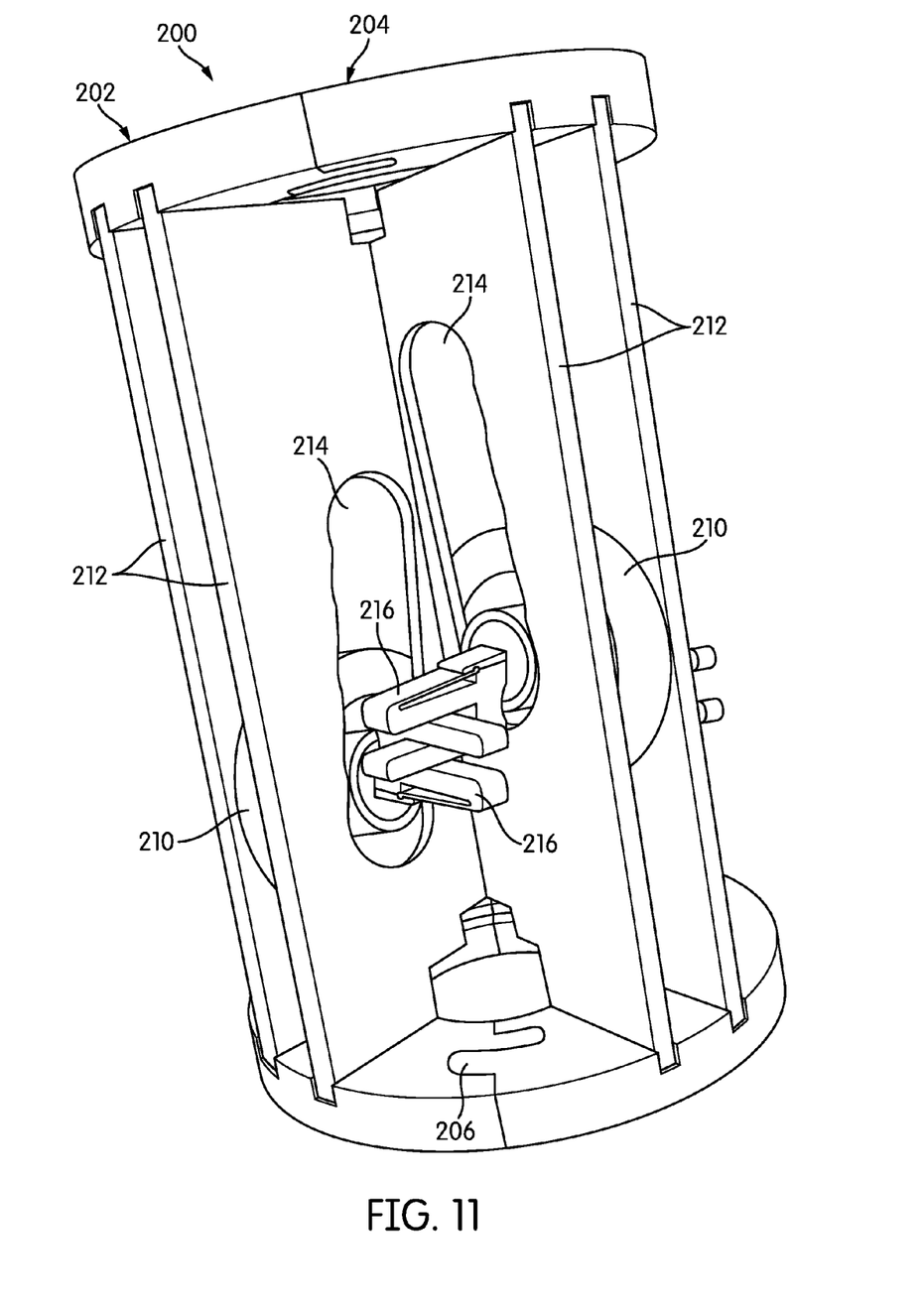
FIG. 11 is a perspective view of the brake of FIG. 10 fully engaged.

FIG. 11 is a perspective view of the brake 200 with both halves 202, 204 fully engaged. As shown, the four wheels 210 oppose one another but are slightly offset in position. Additionally, FIG. 11 also illustrates the profiles of the slots 214 in the guide plates 210, in which at least one inner edge of each is slightly sawtoothed, defining specific positions for the wheels 210 and, as was described above, helping to prevent the wheels from moving backward while the brake 200 is moving forward.

The brake 200 of FIGS. 10 and 11 may be, for example, about 8.25 inches long and about 5.5 inches in diameter. One advantage of the brake 200 as compared with the brake 18 of FIGS. 1-5D is that the brake 200 has less mass. This may decrease any forces generated by the collision of the trolley 14 and the brake 200 and lessen any jolt to the passenger P.

The brake 18 of FIG. 2 and the brake 200 of FIGS. 10 and 11 have certain features in common, notably at least one set of wheels that are spaced around the circumference or inner perimeter of a brake housing so that they oppose one another and are driven inwardly by angled slots in guide plates, so that they contact and come into rolling engagement with a zip line to dissipate energy and stop a trolley 14 and passenger P riding on the line. The wheels 78, 210 themselves are constructed to absorb and dissipate energy, and in both cases, the wheels 78, 210 are coupled together so that they move together.

However, as can be appreciated from the above description, the brakes 18, 200 described above differ primarily in how the wheels 78, 210 are coupled together. The brake 18 uses a fixed carriage-moving carriage arrangement, while the brake 200 relies on forked portions 216 connected to each of the wheels 210. Of course, many other ways of coupling the wheels may be used in embodiments of the invention.

Figure 12:
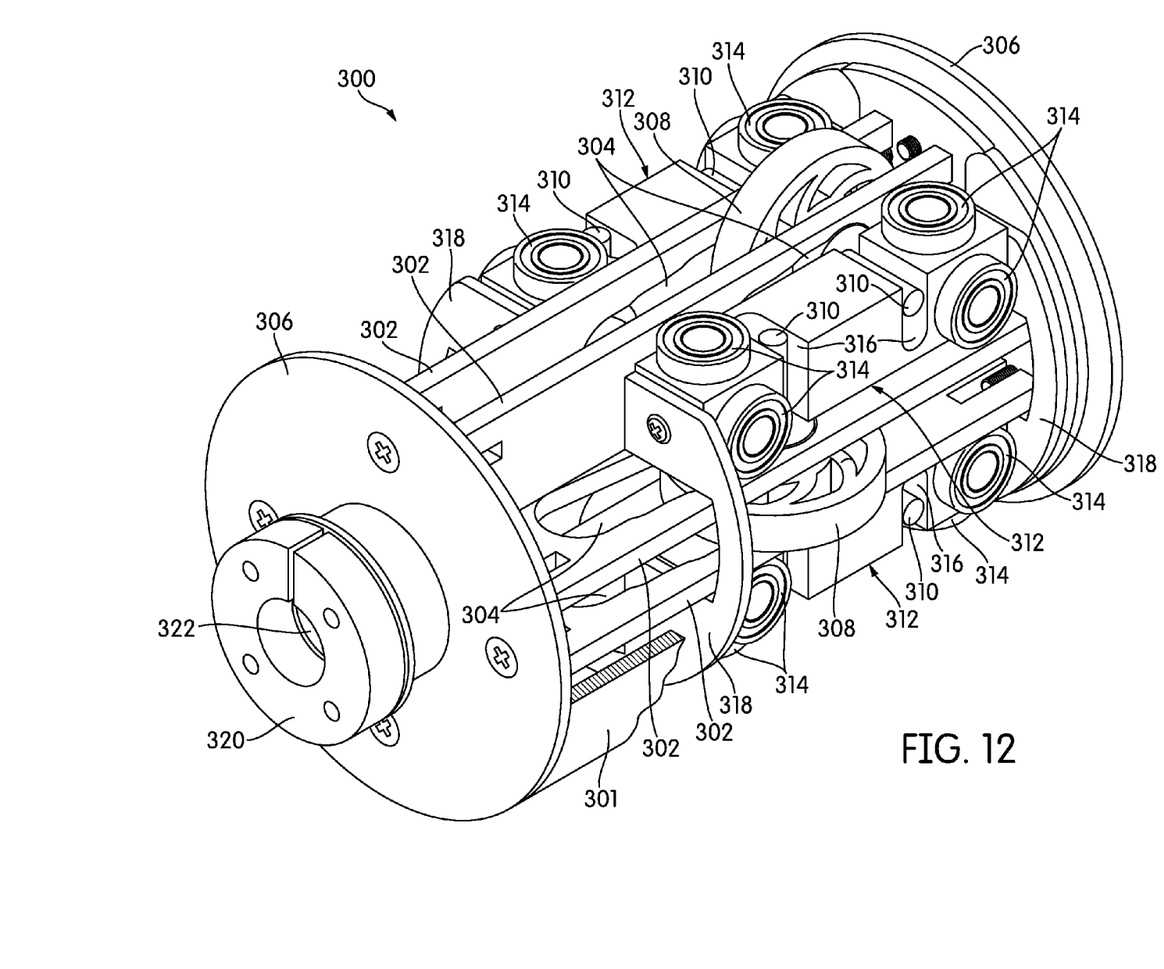
FIG. 12 is a perspective view of the internal components of a brake according to yet another embodiment of the invention, illustrating another mechanism for coupling the wheels in the brake.

FIG. 12 is a perspective view of the interior configuration of yet another embodiment of a brake, generally indicated at 300, according to another embodiment of the invention. The brake 300 is shown without an outer housing 301 in the view of FIG. 12. In the brake 300, four pairs of guide plates 302 with angled slots 304 extend horizontally between two end plates 306 and are spaced evenly around the circumference of the brake 300, so that each pair 302 is spaced approximately 90° from the adjacent pairs. The angled slots 304 of the illustrated embodiment may have an angle in about the same range as the other embodiments, i.e., about 5-7.5°. In the illustrated embodiment, an angle of about 6° may be particularly appropriate.

A single wheel 308 is positioned between each pair of guide plates 302, so that there are four wheels 308 in all (two of which are shown in the perspective view of FIG. 12). The wheels 308 that are spaced 180° from one another are paired and directly oppose to one other, although one pair of wheels 308 may be offset from the other, as shown in FIG. 12. As with the brakes 18, 200 described above, the angled slots 304 have stepped profiles, with at least one non-linear edge that defines specific positions for the wheels.

The wheels 308 have axles 310 that extend through the angled slots 304 in the guide plates 302. The axles 310 are received by coupling blocks 312. The brake 300 of FIG. 12 has four coupling blocks 312. The coupling blocks 312 bear against and slide along the outsides of the guide plates 302, and are provided with pairs of smaller bearing wheels 314 to ensure smooth movement. Each coupling block 312 has two U-shaped slots 316, each U-shaped slot 316 oriented differently, such that each coupling block 312 receives one side of the axle 310 of a wheel 308 oriented in a first direction, and one side of the axle 310 of a wheel 308 offset 90° from the first wheel. Thus, the coupling blocks 312 carry the wheels 308 and couple the wheels 308 together so that they move synchronously.

The four coupling blocks 312 are arranged in pairs, with one pair of coupling blocks 312 on each side of the brake 300. As those of skill in the art will appreciate, the blocks 312 are made in "left-handed" and "right-handed" configurations that are mirror images of one another, with two coupling blocks 312 of each type in the brake 300. Each pair of coupling blocks 312 is connected together by a pair of connecting members 318, one connecting member 318 at each end of each coupling block 312. The connecting members 318 have an arcuate overall shape in the illustrated embodiment, so that they generally follow the cylindrical outer shape of the brake 300. Although the brake 300 of FIG. 12 has four wheels 308, any number of wheels may be included in other embodiments.

Brakes 18, 200, 300 according to embodiments of the invention may be placed on zip lines 16 in a variety of ways. In some embodiments, it may be possible or convenient simply to insert the end of a zip line 16 through the center of the brake 18, 200, 300 before securing the end of the zip line 16. However, it may be helpful if the brake 18, 200, 300 is designed to open longitudinally to receive the zip line 16 in that way, and as shown in the figures, brake 18 and brake 200 can be opened along their longitudinal centerlines and the zip line 16 seated within them. The brake 300 illustrated in FIG. 12 uses a slightly different approach. In the brake 300 of FIG. 12, one or more of the guide plates 302 may rest in slots in the end plates 306, and may be designed to be removed in order to seat the brake 300 on a zip line 16. Essentially, the brake 300 may be designed for relatively easy partial disassembly to permit its installation.

Like the other embodiments, the brake 300 includes an external bumper 320 on one end, and receiving structure 322 designed to capture and engage complementary structure mounted on a trolley 14. Although the brake 300 is shown as having the female engaging structure in this embodiment, and the trolley 14 would thus be provided with male structure, the brake 300 may have the male structure in other embodiments.

While the invention has been described with respect to certain embodiments, the embodiments are intended to be exemplary, rather than limiting. Modifications and changes may be made within the scope of the invention, which is defined by the appended claims.

What is claimed is:
1. A zip-lining brake, comprising:
a housing with first and second ends, the first and second ends having aligned central openings therein, the openings being sized to allow passage of a zip line through the housing;
a plurality of guide plates spaced around and fixedly connected to the interior of the housing, the plurality of guide plates extending between the first and second ends, each of the plurality of guide plates defining at least one angled slot therein, an angle of each of the angled slots being the same;

a plurality of wheels movably mounted between respective ones of the plurality of guide plates in association with the angled slots, such that the movements of the plurality of wheels are guided by the angled slots, the orientation of each of the angled slots being such that the plurality of the wheels are driven inward, toward a center of the housing, as they move horizontally within the housing; and couplers extending between ones of the plurality of wheels that couple and synchronize the movements of the plurality of wheels.

2. The zip-lining brake of claim 1, wherein the plurality of guide plates comprises four pairs of guide plates, each pair of guide plates spaced from one another a distance sufficient to admit one of the plurality of wheels, respective pairs of guide plates being offset from one another such that they are spaced evenly around the interior of the housing.

3. The zip-lining brake of claim 2, wherein the plurality of wheels comprises four wheels, and each of the plurality of guide plates has one of the angled slots therein.

4. The zip-lining brake of claim 2, wherein the plurality of wheels comprises eight wheels, and each of the plurality of guide plates has two of the angled slots therein, the two angled slots in each of the plurality of guide plates being spaced from one another horizontally.

5. The zip-lining brake of claim 1, wherein each of the plurality of wheels comprises:
an outer tread;
a center; and
spokes extending between the center and the outer tread.

6. The zip-lining brake of claim 5, wherein the spokes are arcuate.

7. The zip-lining brake of claim 6, wherein the spokes are flexible and resilient.

8. The zip-lining brake of claim 7, wherein each of the plurality of wheels is made of a urethane resin.

9. The zip-lining brake of claim 5, wherein each of the plurality of wheels is mounted on ball bearings.

10. The zip-lining brake of claim 1, wherein the couplers comprise forked structures attached to axles of each of the plurality of wheels, the forked structures of adjacent ones of the plurality of wheels interengaging to couple the movement of the plurality of wheels.

11. The zip-lining brake of claim 1, wherein the couplers comprise movable blocks that bear against outer surfaces of ones of the plurality of guide plates and receive axles of adjacent ones of the plurality of wheels.

12. The zip-lining brake of claim 11, wherein adjacent movable blocks are connected with connecting members to synchronize movement of the plurality of wheels.

13. The zip-lining brake of claim 1, wherein the angled slots have an angle in the range of about 5-7.5°.

14. The zip-lining brake of claim 13, wherein at least one surface of each of the angled slots has a stepped profile.

15. The zip-lining brake of claim 1, wherein the housing opens longitudinally to admit the zip line.

16. The zip-lining brake of claim 1, further comprising receiving structure adjacent to one or both of the central openings, the receiving structure being adapted to engage corresponding engaging structure of or mounted on a trolley.

17. The zip-lining brake of claim 1, further comprising a bumper installed on the first or the second end.

18. The zip-lining brake of claim 1, wherein the plurality of wheels are driven into rolling engagement with the zip line when the brake is struck with sufficient force from a first direction.

19. A system for braking and recovering a zip line trolley, comprising:
a trolley adapted to ride on a zip line along a specified direction of travel; and
a brake adapted to be placed on the zip line to contact the trolley as it moves in the specified direction of travel, the brake including
a housing with first and second ends, the first and second ends having aligned central openings therein, the openings being sized to allow passage of the zip line through the housing,
four pairs of guide plates attached between the first and second ends, the four pairs of guide plates being spaced evenly around an interior of the housing, each guide plate of the four pairs of guide plates having an angled slot,
four or more wheels, each of the four or more wheels being mounted between one of the four pairs of guide plates in association with one of the angled slots, the angled slots being oriented such that the wheels are driven inward and into rolling engagement with the zip line as the brake is contacted with a sufficient velocity and moves in the specified direction of travel, and
couplers extending between the wheels to couple and synchronize their movement.

20. The system of claim 19, further comprising:
engaging structure on the trolley; and
complementary engaging structure provided on the brake, the engaging structure on the trolley and the complementary engaging structure on the brake being arranged such that the trolley will engage the brake as the trolley moves in the specified direction of travel or as the brake moves toward the trolley in a direction opposite the direction of travel.

21. The system of claim 20, further comprising a line connected between the brake and a fixed point proximate to an end of the zip line, the line allowing a user to haul the engaged brake and trolley toward the end of the zip line.

* * * * *